United States Patent
Sridhara et al.

(10) Patent No.: US 9,450,711 B2
(45) Date of Patent: Sep. 20, 2016

(54) METHOD AND APPARATUS FOR EXTENDED REVERSE DIRECTION GRANT IN A WIRELESS LOCAL AREA NETWORK (WLAN)

(75) Inventors: Vinay Sridhara, Santa Clara, CA (US); Sanjiv Nanda, Ramona, CA (US); Santosh P. Abraham, San Diego, CA (US); Srinivas Kandala, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1234 days.

(21) Appl. No.: 12/361,773

(22) Filed: Jan. 29, 2009

(65) Prior Publication Data

US 2009/0252110 A1    Oct. 8, 2009

Related U.S. Application Data

(60) Provisional application No. 61/041,670, filed on Apr. 2, 2008, provisional application No. 61/090,419, filed on Aug. 20, 2008.

(51) Int. Cl.

| H04W 74/06 | (2009.01) |
| H04W 84/12 | (2009.01) |
| H04L 1/16  | (2006.01) |
| H04L 1/18  | (2006.01) |
| H04L 1/00  | (2006.01) |

(52) U.S. Cl.
CPC ............ *H04L 1/1854* (2013.01); *H04W 74/06* (2013.01); *H04L 1/1614* (2013.01); *H04L 2001/0093* (2013.01); *H04W 84/12* (2013.01)

(58) Field of Classification Search
CPC .. H04W 74/06; H04W 84/12; H04L 1/1614; H04L 2001/0093
See application file for complete search history.

(56) References Cited

U.S. PATENT DOCUMENTS

| 5,528,605 A | 6/1996 | Ywoskus et al. |
| 5,754,754 A | 5/1998 | Dudley et al. |

(Continued)

FOREIGN PATENT DOCUMENTS

| CN | 1689262 A | 10/2005 |
| CN | 1691663 A | 11/2005 |

(Continued)

OTHER PUBLICATIONS

Coffey. S., et al., "WWISE IEEE 802.11n Proposal," doc.: IEEE 802.11-04/0935r3, Sep. 2004, pp. 1-60.

(Continued)

*Primary Examiner* — Jianye Wu
(74) *Attorney, Agent, or Firm* — Dang M. Vo

(57) ABSTRACT

Systems, methods, and apparatus for extended reverse direction grant in a WLAN are provided. In one aspect, a method for communication using a channel that is common to a plurality of nodes is provided. The method includes transmitting first data to the plurality of nodes using a first transmission resource. The first data is transmitted within a transmit opportunity time interval and comprises a first indicator. The method further includes receiving, in response to the first indicator, at least one data transmission from at least one of the nodes, respectively. The at least one data transmitted using at least one second transmission resource, respectively, and is received within the transmit opportunity time interval.

46 Claims, 12 Drawing Sheets

(56) References Cited

U.S. PATENT DOCUMENTS

| | | | |
|---|---|---|---|
| 7,120,852 | B2 | 10/2006 | Terry et al. |
| 7,463,642 | B2 | 12/2008 | Qian |
| 7,804,762 | B2 | 9/2010 | Stephens et al. |
| 2005/0068895 | A1 | 3/2005 | Stephens et al. |
| 2005/0169232 | A1 | 8/2005 | Sakoda et al. |
| 2005/0237992 | A1 | 10/2005 | Mishra et al. |
| 2005/0238016 | A1 | 10/2005 | Nishibayashi et al. |
| 2006/0056443 | A1 | 3/2006 | Tao et al. |
| 2006/0092871 | A1 | 5/2006 | Nishibayashi et al. |
| 2007/0058605 | A1 | 3/2007 | Meylan et al. |
| 2007/0115180 | A1 | 5/2007 | Kish et al. |
| 2007/0147284 | A1* | 6/2007 | Sammour et al. ............ 370/328 |
| 2007/0153760 | A1 | 7/2007 | Shapira |
| 2007/0165590 | A1 | 7/2007 | Kneckt et al. |
| 2007/0298742 | A1* | 12/2007 | Ketchum et al. .......... 455/186.1 |
| 2008/0002615 | A1* | 1/2008 | Nakajima et al. ............ 370/328 |
| 2008/0075004 | A1 | 3/2008 | Mishima |
| 2008/0285523 | A1* | 11/2008 | Bjorken ...................... 370/336 |
| 2009/0181687 | A1 | 7/2009 | Tiirola et al. |
| 2009/0203323 | A1 | 8/2009 | Ratasuk et al. |
| 2009/0213767 | A1 | 8/2009 | Trainin et al. |
| 2009/0225700 | A1 | 9/2009 | Shen et al. |
| 2009/0252100 | A1 | 10/2009 | Sridhara et al. |
| 2009/0252143 | A1 | 10/2009 | Sridhara et al. |
| 2010/0189056 | A1 | 7/2010 | Nishibayashi et al. |

FOREIGN PATENT DOCUMENTS

| | | |
|---|---|---|
| CN | 1747474 A | 3/2006 |
| CN | 1826762 A | 8/2006 |
| CN | 1853377 A | 10/2006 |
| CN | 101268660 A | 9/2008 |
| CN | 101292447 A | 10/2008 |
| CN | 101297561 A | 10/2008 |
| DE | 2006014492 | 2/2007 |
| EP | 1589704 A2 | 10/2005 |
| EP | 1641180 A1 | 3/2006 |
| EP | 1777878 A1 | 4/2007 |
| JP | 2005039728 A | 2/2005 |
| JP | 2005252897 A | 9/2005 |
| JP | 2005348388 A | 12/2005 |
| JP | 2006050519 A | 2/2006 |
| JP | 2006129393 A | 5/2006 |
| JP | 2007525092 A | 8/2007 |
| JP | 2009509469 A | 3/2009 |
| WO | 2005004500 A2 | 1/2005 |
| WO | WO-2006008638 A1 | 1/2006 |
| WO | WO2006091809 | 8/2006 |
| WO | WO-2006096753 A2 | 9/2006 |
| WO | 2007038118 A2 | 4/2007 |
| WO | 2007046618 A1 | 4/2007 |
| WO | WO-2007087842 A1 | 8/2007 |
| WO | WO-2008114662 A1 | 9/2008 |

OTHER PUBLICATIONS

Fischer. M., "WWISE MAC Proposal for TGn," doc.: IEEE 802.11-05/0016r2, Jan. 17, 2005, pp. 1-56.

International Search Report and Written Opinion—PCT/US10/022611, International Search Authority—European Patent Office, May 7, 2010.

Taiwan Search Report—TW099102720—TIPO—Dec. 10, 2012.

Jang K. et al., "Samsung MAC Proposal Technical Specifications", IEEE, IEEE, Piscataway, NJ, USA, vol. IEEE P802.11 Wireless LANs, Aug. 30, 2004 (Aug. 30, 2004), pp. 1-33, XP040384653.

Kim S., et al., "MCCA: A High-Throughput MAC Strategy for Next-Generation WLANS," Medium Access Control Protocols for Wireless LANS, IEEE Wireless Communications, Feb. 2008, pp. 32-39.

Bansal A., et al., "Lb84 Cid 7366 Text Proposal", IEEE, 802.11-06/1054r1, Sep. 2006, pp. 1-3, URL, https://mentor.ieee.org/802.11/dcn/06/11-06-1054-01-000n-1b84-cid-7366-text-proposal.doc.

Mujtaba S.A., "TGn Sync Proposal Technical Specification", IEEE 802.11-04/889r0, Aug. 2004, pp. 13-15, 19-21, URL, https://mentor.ieee.org/802.11/dcn/04/11-04-0889-00-000n-tgnsync-proposal-technical-specification.doc.

\* cited by examiner

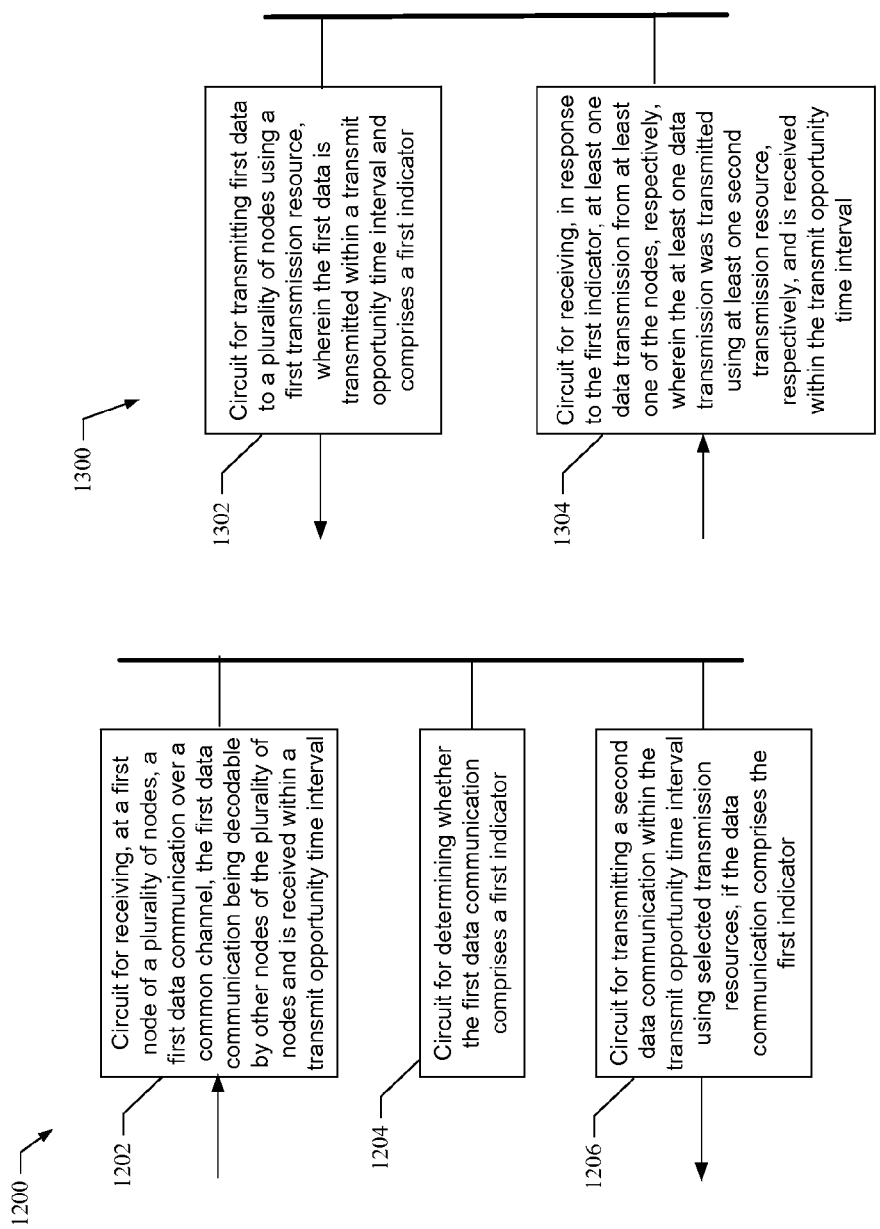

METHOD AND APPARATUS FOR EXTENDED REVERSE DIRECTION GRANT IN A WIRELESS LOCAL AREA NETWORK (WLAN)

CLAIM OF PRIORITY UNDER 35 U.S.C. §119

The present Application for Patent claims priority to Provisional Application No. 61/041,670 having and entitled "METHOD AND APPARATUS FOR ACKNOWLEDGMENT IN A WIRELESS LOCAL AREA NETWORK (WLAN)" filed Apr. 2, 2008, and assigned to the assignee hereof and hereby expressly incorporated by reference herein.

The present Application for Patent claims priority to Provisional Application No. 61/090,419 having and entitled "METHOD AND APPARATUS FOR ACKNOWLEDGMENT IN A WIRELESS LOCAL AREA NETWORK (WLAN)" filed Aug. 20, 2008, and assigned to the assignee hereof and hereby expressly incorporated by reference herein.

BACKGROUND

1. Field

The present application relates generally to the operation of wireless communication systems, and more particularly, to methods and apparatus for extended reverse direction grant in a wireless communication network

2. Background

With the increasing popularity of wireless networks, there is an ever greater need to increase the throughput from existing bandwidth allocations to increase system efficiency. One method of increasing the efficiency in the Media Access Control (MAC) layer is to utilize Reverse Direction Grant (RDG). RDG is a mechanism, for example, as defined in IEEE 802.11n, to transfer data in both directions without initiating a new transfer procedure. A station transmits a frame to another station indicating that the receiving station can send back data if its buffers indicates it to do so. This mechanism makes use of a Transmission Opportunity (TxOP), when the TxOP holder (initial sender) does not have enough frames to make use of the entire TxOP duration.

Unfortunately, the current RDG mechanism is problematic when transmitting data to multiple stations simultaneously. For example, data to be transmitted to multiple stations that is queued at the transmitter suffers from increased delay and jitter. Also, the current RDG mechanism suffers from increased MAC inefficiency due to mandatory spacing that needs to be provided between data transmissions and responses to multiple stations. This inefficiency is especially noticeable at higher data rates.

Therefore, there is a need in the art to provide solutions to the above identified problems to increase throughput and bandwidth efficiency in wireless networks.

SUMMARY

In various aspects, an extended reverse direction grant system comprising methods and apparatus is provided that operates to increase the efficiency of a WLAN. For example, the system provides an enhanced extended reverse direction grant mechanism to increase the efficiency at which multiple devices exchange data over the WLAN.

In an aspect, a method is provided for communication using a channel that is common to a plurality of nodes. The method comprises transmitting first data to the plurality of the nodes using a first transmission resource, wherein the first data is transmitted within a transmit opportunity time interval and comprises a first indicator. The method also comprises receiving, in response to the first indicator, at least one data transmission from at least one of the nodes, respectively, wherein the at least one data transmission was transmitted using at least one second transmission resource, respectively, and is received within the transmit opportunity time interval.

In an aspect, an apparatus is provided for communication using a channel that is common to a plurality of nodes. The apparatus comprises a transmitter configured to transmit first data to the plurality of the nodes using a first transmission resource, wherein the first data is transmitted within a transmit opportunity time interval and comprises a first indicator. The apparatus also comprises a receiver configured to receive, in response to the first indicator, at least one data transmission from at least one of the nodes, respectively, wherein the at least one data transmission was transmitted using at least one second transmission resource, respectively, and is received within the transmit opportunity time interval.

In an aspect, an apparatus for communication using a channel that is common to a plurality of nodes. The apparatus comprises means for transmitting first data to the plurality of the nodes using a first transmission resource, wherein the first data is transmitted within a transmit opportunity time interval and comprises a first indicator. The apparatus also comprises means for receiving, in response to the first indicator, at least one data transmission from at least one of the nodes, respectively, wherein the at least one data transmission was transmitted using at least one second transmission resource, respectively, and is received within the transmit opportunity time interval.

In an aspect, a method is provided for communication using a channel that is common to a plurality of nodes. The method comprises receiving, at a first node of the plurality of nodes, a first data communication over the common channel, the first data communication being decodable by other nodes of the plurality of nodes and is received within a transmit opportunity time interval. The method also comprises determining whether the first data communication comprises a first indicator, and transmitting a second data communication within the transmit opportunity time interval using selected transmission resources, if the first data communication comprises the first indicator.

In an aspect, an apparatus is provided for communication using a channel that is common to a plurality of nodes. The apparatus comprises a receiver configured to receive, at a first node of the plurality of nodes, a first data communication over the common channel, the first data communication being decodable by other nodes of the plurality of nodes and is received within a transmit opportunity time interval. The apparatus also comprises a controller configured to determine whether the first data communication comprises a first indicator, and a transmitter configured to transmit a second data communication within the transmit opportunity time interval using selected transmission resources, if the first data communication comprises the first indicator.

In an aspect, an apparatus is provided for communication using a channel that is common to a plurality of nodes. The apparatus comprises means for receiving, at a first node of the plurality of nodes, a first data communication over the common channel, the first data communication being decodable by other nodes of the plurality of nodes and is received within a transmit opportunity time interval. The apparatus also comprises means for determining whether the first data communication comprises a first indicator, and means for transmitting a second data communication within the transmit opportunity time interval using selected transmission resources, if the first data communication comprises the first indicator.

Other aspects will become apparent after review of the hereinafter set forth Brief Description of the Drawings, Description, and the Claims.

BRIEF DESCRIPTION OF THE DRAWINGS

FIG. 12 shows an exemplary access terminal for use in aspects of an extended RDG system; and FIG. 13 shows an exemplary access point for use in aspects of an extended RDG system.

DESCRIPTION

Various aspects of the invention are described below. It should be apparent that the teachings herein may be embodied in a wide variety of forms and that any specific structure, function, or both being disclosed herein are merely representative. Based on the teachings herein one skilled in the art should appreciate that any aspect of the invention disclosed herein may be implemented independently of any other aspects and that multiple aspects of the invention may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. An aspect may comprise one or more elements of a claim.

Figure 1:
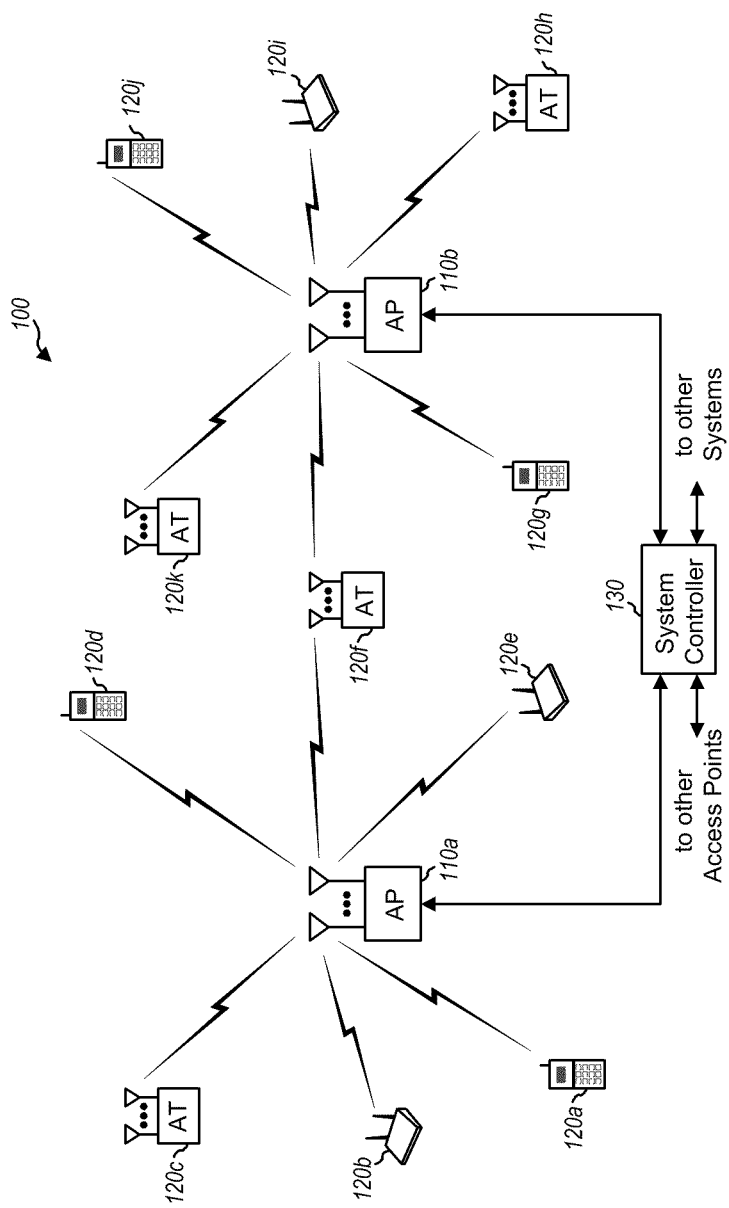
FIG. 1 shows a MIMO WLAN system that supports a number of users and is capable of implementing various aspects of an extended RDG system.

The following acronyms are used herein to describe aspects of an extended RDG system.
1. PPDU—Physical Layer Protocol Data Unit
2. SIFS—Short Interframe Space
3. APPDU—Aggregate Physical Layer Protocol Data Unit
4. CDMA—Code Division Multiple Access
5. OFDMA—Orthogonal Frequency Division Multiple Access
6. SDMA—Space Division Multiple Access
7. TDMA—Time Division Multiple Access
8. HTC—High Throughput Control
9. TxOP—Transmit Opportunity
10. TRM—Training Request Message
11. ACK—Acknowledgement
12. BA—Block Acknowledgement FIG. 1 shows a MIMO WLAN system 100 that supports a number of users and is capable of implementing various aspects of an extended reverse direction grant system. The described aspects can be used with various WLAN systems and are not limited to use with the MIMO WLAN system 100, which is shown and described for exemplary purposes.

The MIMO WLAN system 100 includes a number of access points (APs) 110 that support communication for a number of user terminals (UTs) 120. For example, an access point may comprise, be implemented as, or known as NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology. Furthermore, a user terminal may comprise, be implemented as, or known as an access terminal (AT), a subscriber station, a subscriber unit, a mobile station, a remote station, a remote terminal, a user terminal, a user agent, a user device, user equipment (UE), or some other terminology. In some implementations an access terminal may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem.

Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium.

For simplicity, only two access points 110a and 110b are shown in FIG. 1. User terminals 120a-k may be dispersed throughout the system. Each user terminal may be a fixed or mobile terminal that can communicate with the access point. Each user terminal may communicate with one or possibly multiple access points on the downlink and/or uplink at any given moment. The downlink (i.e., forward link) refers to transmission from the access points to the user terminals, and the uplink (i.e., reverse link) refers to transmission from the user terminals to the access points.

The access point 110a communicates with user terminals 120a through 120f and access point 110b communicates with user terminals 120f through 120k. Depending on the specific design of system 100, an access point may communicate with multiple user terminals simultaneously (e.g., via multiple code channels or sub-bands) or sequentially (e.g., via multiple time slots). At any given moment, a user terminal may receive downlink transmissions from one or multiple access points. The downlink transmission from each access point may include overhead data intended to be received by multiple user terminals, user-specific data intended to be received by specific user terminals, other types of data, or any combination thereof. The overhead data may include pilot, page and broadcast messages, system parameters, and so on.

The MIMO WLAN system 100 is based on a network architecture having a centralized controller. Thus, a system controller 130 couples to access points 110a-b and may further couple to other systems and networks. For example, system controller 130 may couple to a packet data network (PDN), a wired local area network (LAN), a wide area network (WAN), the Internet, a public switched telephone network (PSTN), a cellular communication network, and so on. System controller 130 may be designed to perform a number of functions such as (1) coordination and control for the access points coupled to it, (2) routing of data among these access points, (3) access and control of communication with the user terminals served by these access points, and so on.

During operation of the system 100, the access point 110a communicates with the user terminals 120a-120f. In this example, access point 110a acts as the transmitter station and has packets queued for transmission to the receiving user terminals 120a-120f. The following description describes transmissions and acknowledgements in accordance with various aspects of an extended reverse direction grant system.

Figure 2:
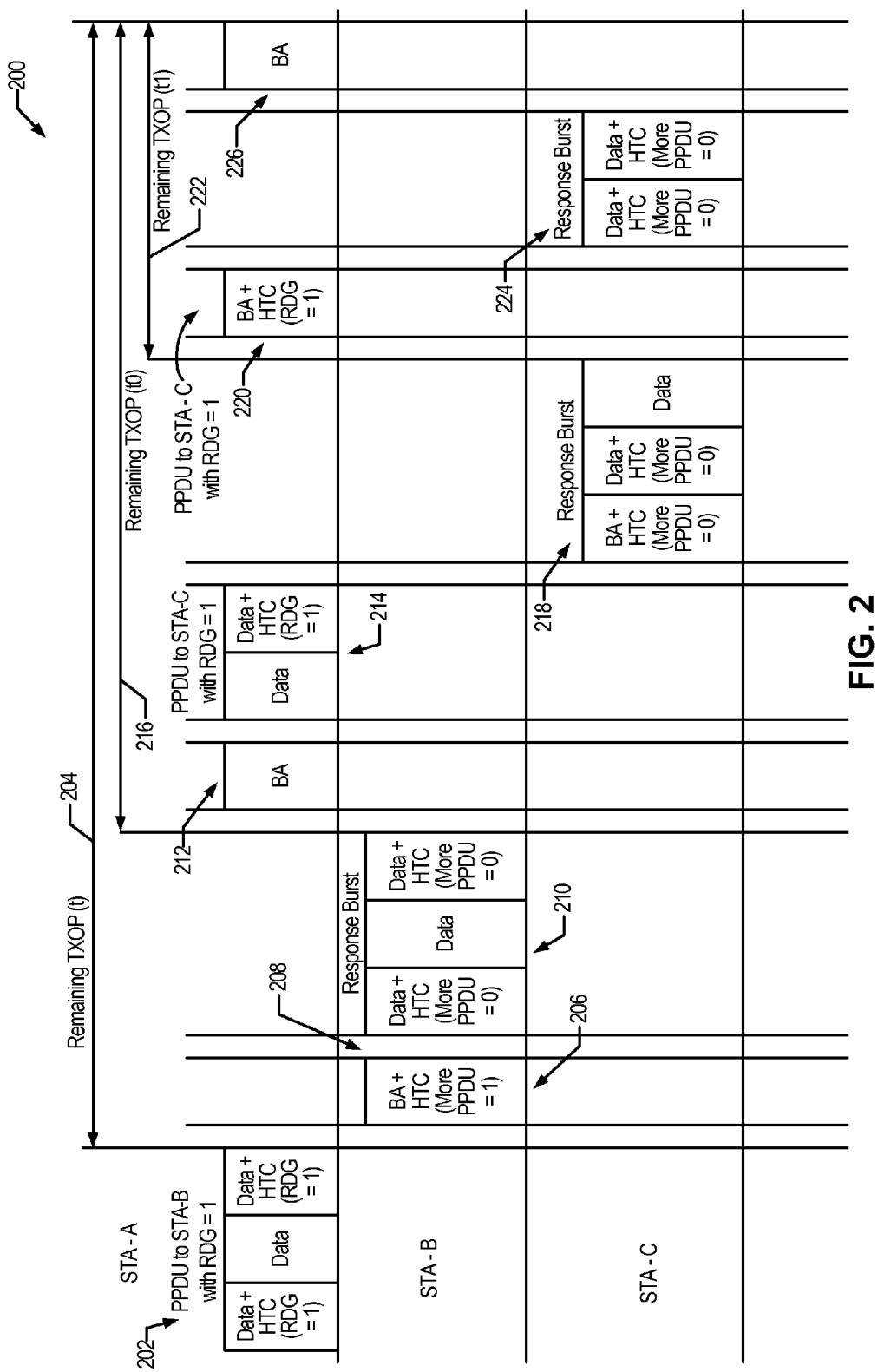
FIG. 2 shows a diagram illustrating the operation of the system shown in FIG. 1 to perform a transmission and reception exchange in accordance with IEEE 802.11 protocols.

FIG. 2 illustrates the operation of the system 100 to perform a transmission and reception exchange in accordance with IEEE 802.11 protocols. For example, transmission and reception exchanges between transmitting station STA-A and receiving stations STA-B and STA-C utilizing conventional reverse direction grant are illustrated.

In FIG. 2, STA-A is an RD initiator and transmits a PPDU 202 containing MSDUs addressed to STA-B (RD Responder). The ACK policy field of the QoS data MPDUs in this PPDU is set to implicit Block ACK request. One or more MSDUs within this PPDU contain an HTC field with the RDG/More PPDU field set to 1, indicating an RDG. The Duration/ID field contains the remaining time duration 204 of the TxOP=t, where t is in microseconds (us).

The STA-B (RD Responder) responds with the transmission of Block ACK frame 206 in which the RDG/More PPDU field is set to 1, indicating that another PPDU will follow a SIFS or RIFS time interval 208 after the end of the PPDU containing the Block ACK.

The STA-B transmits a PPDU (second PPDU of the response burst) 210 to STA-A, with the ACK policy set to implicit Block ACK request. This PPDU also contains one or more MPDUs containing an HTC field in which the RDG/More PPDU field is set to 0, indicating that this is the last PPDU of the response burst.

The STA-A (RD Initiator) regains control of the TxOP and transmits a Block ACK MPDU 212 addressed to STA-B to acknowledge the receipt of the MPDUs transmitted by STA-B in the RD response burst.

In this example, STA-A (RD Initiator) transmits a PPDU 214 containing MPDUs addressed to STA-C (new RD Responder). The ACK policy field of the QoS data MPDUs in this PPDU is set to implicit Block ACK request. This PPDU contains one or more HTC MPDUs, in which the RDG/More PPDU field is set to 1, indicating an RDG. The Duration/ID field of the MPDUs in this PPDU contains the remaining time duration 216 of the TxOP=t0 (us).

In response, STA-C (RD Responder) transmits a PPDU 218 to STA-A containing one more HTC MPDUs in which the RDG/More PPDU field is set to 0, indicating that this is the last PPDU in the response burst. This PPDU contains a Block ACK MPDU that is a response frame to the Implicit Block ACK request of the previous PPDU from STA-A, plus the QoS data MPDUs with the ACK policy field set to implicit Block ACK request.

The STA-A (RD-Initiator) regains control of the TxOP and transmits a Block ACK PPDU 220 acknowledging the MPDUs transmitted by STA-C. This PPDU contains one or more HTC MPDUs with the RDG/More PPDU field set to 1, indicating an RDG. The Duration/ID field of MPDUs in the PPDU contains the remaining time duration 222 of the TxOP=t1 (us).

In response, STA-C (RD-Responder) transmits a PPDU 224 to STA-A containing one or more QoS Data HTC MPDUs with the ACK policy set to implicit Block ACK and the RDG/More PPDU field set to 0. This is the only PPDU in the response burst.

In response, STA-A (RD-Initiator) transmits a Block ACK 226 to STA-C that acknowledges the MPDUs transmitted by STA-C in the previous RD response burst.

Thus, FIG. 2 illustrates transmission and reception exchanges between transmitting station STA-A, and receiving stations STA-B and STA-C utilizing conventional reverse direction grant.

Extended Reverse Direction Grant

In various aspects, an extended RDG system is provided that operates to extent RDG to multiple users making use of APPDU, unidirectional or bidirectional OFDMA or SDMA, or OFDMA+SDMA transmission techniques and other multiple access technologies or combinations thereof. For example, with regards to multiple users the operation of the extended RDG system is described below.

1. APPDU/OFDMA, PPDU/SDMA, PPDU transmissions to multiple STAs by the TxOP holder containing an RDG indicator which is indicated by the PPDU containing one or more HTC MPDUs in which the RDG/More PPDU field in set to 1. The STA that transmits these PPDUs is known as the RD Initiator. The rules for this RD initiator apply only during a single RD exchange sequence, i.e. after the transmission of an RD grant PPDU and up to the end of the last PPDU in the RD exchange.

2. The OFDMA/SDMA transmission of one or more PPDUs (RD SDMA Response Burst) by the STAs receiving the RD grant by the RD Initiator (TxOP holder). The last (or only) PPDU of the SDMA RD response burst contains any MPDUs requiring immediate Block ACK or ACK response. The STA that transmits the RD burst in known as the RD Responder. The rules for the RD Responder apply only during a single RD exchange sequence. For example, the rules apply following the reception of an SDMA/OFDMA RDG PPDU and up to the transmission of a PPDU by the RD responder in which the RDG/More bit is set to 0.

3. The transmission of a APPDU/SDMA PPDU/OFDMA PPDU by the RD Initiator containing an immediate Block ACK or ACK MPDU, if so required by the last PPDU of the RD Response Burst. The transmission of a PPDU by the RD Responder containing an immediate Block ACK or ACK MPDU, if so required by the last PPDU of the RD Initiator in which the RDG/More bit was set to 0.

Thus in various aspects, the extended RDG system operates to provide for increase bandwidth efficiency and/or throughput and may be implemented in networks using a variety of transmission technologies such as TDMA, SDMA, OFDMA, CDMA and/or combinations thereof In an aspect, while using SDMA or OFDMA or SDMA+OFDMA on the uplink, the TxOP holder or the RD-Initiator is responsible for scheduling the receiving STAs to use certain frequency tones for OFDMA or certain Spatial Dimensions for SDMA or both frequency tones and spatial dimensions for SDMA+OFDMA.

In another aspect, while using multi-access schemes such as OFDMA or SDMA, consideration is given to the fact that the schedules are also based on the amount of data that a STA has buffered for transmission along with other parameters such as QoS, priority, etc. Without such consideration, there might be buffer under-runs at some stations, which lead to wasted frequency and spatial dimensions. In an aspect, a buffer status (BS) indicator is used by the STAs to provide an efficient scheduling mechanism for efficient frequency and spatial reuse.

In an aspect, the buffer status is a part of the QoS frame and the stations can indicate their buffer status (current buffer status and a statistical average over a period of time) to the scheduling station so that this information is weighted when assigning frequency tones or spatial dimensions to this STA. In an aspect, this mechanism can be combined with a training request (TRQ) mechanism before beginning the RDG sequence with the RD-Initiator and/or RD-Responders using OFDMA or SDMA or OFDMA+SDMA. The following description illustrates the use of APPDU/SDMA, PPDUs/OFDMA, and PPDUs in aspects of an extended RDG system.

Figure 3:
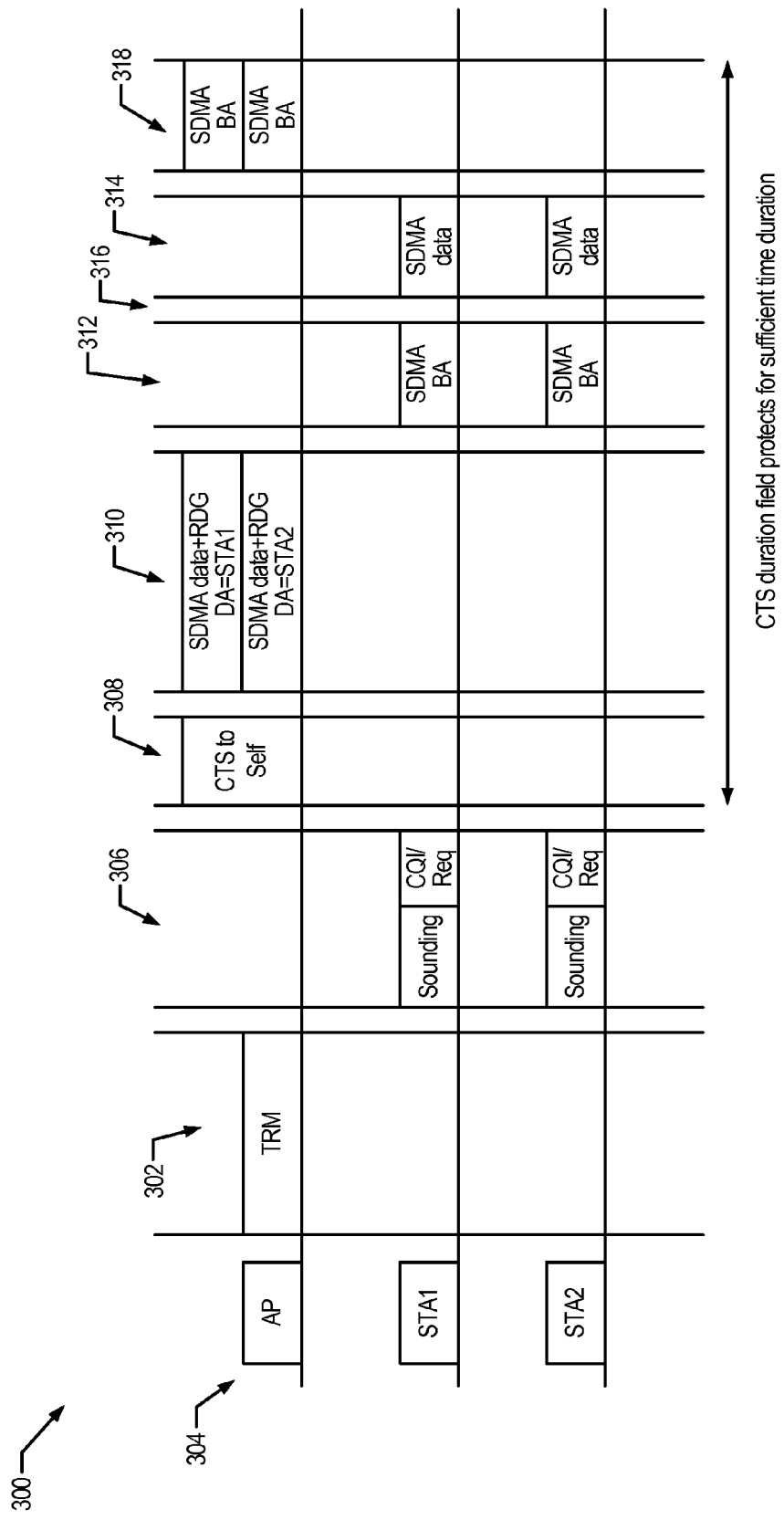
FIG. 3 shows a diagram that illustrates extended RDG operation in accordance with aspects of an extended RDG system.

FIG. 3 shows a diagram 300 that illustrates extended RDG operation in accordance with aspects of an extended RDG system. The extended RDG system efficiently utilizes an acquired TxOP by a transmitting node by permitting multiple receiving nodes to send data back to the transmitter without additional contention. This is particularly useful if the initial sender does not have enough frames to make use of the entire TxOP duration. Also, the system increases MAC efficiency by saving on contention access on the reverse link. In an aspect, an RD initiator (initial sender, TxOP holder) grants the reverse direction transmission opportunity by setting a bit "RDG/More PPDU" in the HTC field to 1.

In one implementation, the RD initiator specifies transmission resources comprising time, frequency, spatial stream or a combination thereof to be used by each respective node when responding with data within the TxOP. For example, the RD initiator starts by encoding one or more resource identifiers in a data transmission to a plurality of nodes. Each node then identifies the transmission resources it is to use for data transmissions back to the RD initiator based on the resource identifiers.

In still another aspect, the inclusion of the resource identifiers in the initial data transmission operates as an implicit RDG to the receiving nodes. Thus, in this case, it is not necessary to set any bits in a particular HTC field to enable RDG. For example, a receiving node receives a data transmission from an RD initiator and determines that the data transmission comprises resource identifiers for the purpose of RDG. The receiving node then determines that since resource identifiers have been detected, then RDG has been enabled. Therefore, an RD initiator may indicate RDG in one of two ways. In the first way, a bit is set in a particular HTC field. In a second way, resource identifiers are included in the initial data transmission.

The following describes the operation of the extended RDG system to exchange data with multiple access terminals utilizing SDMA transmission technology.

The SDMA transaction begins by the transmission of a training request message (TRM) 302 by an access point 304 that initiates the SDMA transmission. After a sounding frame 306 has been received from each RD responder, in response to the TRM message, the buffer status of all the responding STAs is known. Also the RD initiator has the knowledge of the channel to each of these stations. This information is necessary for using the right modulation coding scheme for robust transmission/reception. Hence the RD initiator (AP 304) can make an informed decision about granting RD transmission opportunity to these STAs.

The RD initiator (AP 304) performs a clear to send (CTS-To-Self) 308 to clear the transmission channel. The RD initiator 304 then transmits data 310 and indicates RDG with the maximum remaining TxOP duration. It is at the discretion of the receiving STAs to make use of this duration up to the indicated maximum allowable duration. Each MPDU (within an AMPDU) on the downlink indicates the Block ACK transmission offset. All the SDMA transmission recipients respond with an SDMA Block ACK 312 at the specified schedule.

The data transmission on the reverse link (shown at 314), if any, will start after a SIFS duration 316 following the Block ACK 312 transmission. This corresponds to the Block ACK transmission MCS defined in the Block ACK info field. The RD initiator (AP 304) receives the data from the RD responders and transmits corresponding Block ACKs 318.

Thus, the extended RDG system operates to provide RDG to multiple stations thereby increasing bandwidth utilization and network efficiency.

Figure 4:
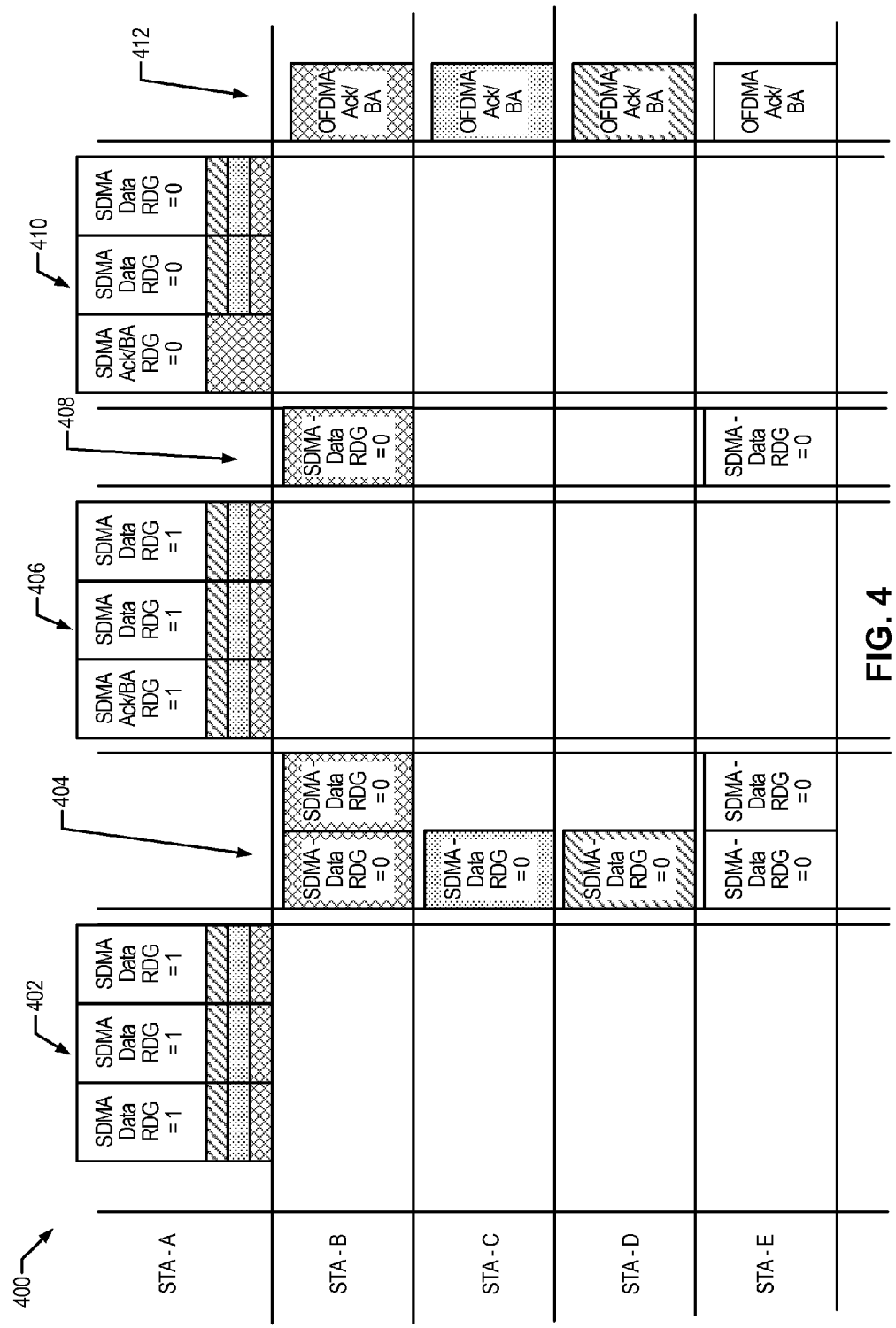
FIG. 4 shows a diagram that illustrates extended RDG operation with an RD-Initiator and RD-Responders using SDMA for use in aspects of an extended RDG system.

FIG. 4 shows a diagram 400 that illustrates extended RDG operation with RD-Initiator and RD-Responders using SDMA for transmissions in aspects of an extended RDG system. Referring now to FIG. 4, the following operations are performed.

1. The STA-A (RD Initiator) sends SDMA PPDUs 402 to the stations STA-B, STA-C, STA-D and STA-D (RD Responders). These SDMA PPDUs contains QoS Data MPDUs with the ACK policy field set to implicit Block ACK request. One or more of the MSDUs in this PPDU contain an HTC field with the RDG PPDU field set to 1, indicating an RDG. The Duration/ID field contains the remaining duration of the TxOP.

2. The RD Responders (STA-B, STA-C, STA-D and STA-E) respond with the SDMA PPDUs 404 to STA-A containing one or more VHTC MPDUs in which the RDG field is set to 0, indicating that this is the last PPDU in the response burst. This PPDU contains a Block ACK MPDU that is a response frame to the Implicit Block ACK request of the previous PPDU from the STA-A, plus the QoS data MPDUs with the ACK policy field set to implicit Block ACK request.

3. The STA-A (RD Initiator) regains the control over TxOP and sends SDMA PPDUs 406 to the stations STA-B, STA-C, STA-D and STA-E (SDMA RD Responders). The first (or only) MPDU of these transmissions contain the Block ACK in response to the SDMA Response burst from the RD Responders. One or more of the MSDUs in this PPDU contain VHT control field with the RDG PPDU field set to 1, indicating an SDMA RDG. The Duration/ID field contains the remaining time duration of the TxOP.

4. The RD Responders (STA-B, STA-C, STA-D, and STA-E) respond with the SDMA PPDUs 408 to STA-A containing one or more VHTC MPDUs in which the RDG field is set to 0, indicating that this is the last PPDU in the response burst. The PPDUs contain a Block ACK MPDU that is a response frame to the Implicit Block ACK request to the previous PPDU from the STA-A. Now STA-C and STA-D do not have any more QoS data to send and hence the SDMA PPDUs from these stations contain only the Block ACK MPDU. STA-B and STA-E respond with the SDMA PPDU containing the Block ACK plus the QoS data MPDUs with the ACK policy field set to implicit Block ACK request.

5. STA-A (RD Initiator) regains control of the TxOP and transmits SDMA PPDUs 410 to RD Responders (STA-B, STA-C, STA-D, and STA-E). The SDMA PPDU to STA-B and STA-E contain Block ACK MPDU in response to the previous implicit Block ACK request. One or more MPDUs in this PPDU contain the VHT control field with the RDG PPDU field set to 0. This indicates the end of RDG in this TxOP. The Duration/ID field of MPDUs in this SDMA PPDU contains the remaining TxOP time duration.

6. SDMA RD Responders (STA-B, STA-C, STA-D, and STA-E) transmit Block ACKs 412 to STA-A that acknowledges the MPDUs transmitted by STA-A.

Thus, the various aspects of the extended RDG system also operate to eliminate the need for an explicit block acknowledgment request (BAR) from the transmitter: which may save valuable system resources. For example, an explicit BAR could be 24-Bytes of MAC header with an additional overhead of PLCP Preamble+PLCP Signal Field+Service+Tail and Pad bits. In addition, the various aspects ensure that the buffer levels at the transmitter are kept relatively low as compared to conventional methods. Moreover, the various aspects provide flexibility to the RD-Initiator for reassigning the spatial streams in case of SDMA or more bandwidth in case of OFDMA or both in case of a combined SDMA+OFDMA scheme to other recipients of the RDG. Thus, increased transmission data rates and/or more robust transmissions may be achieved. In addition, the spatial and frequency reuse may increase and be more efficient.

Figure 5:
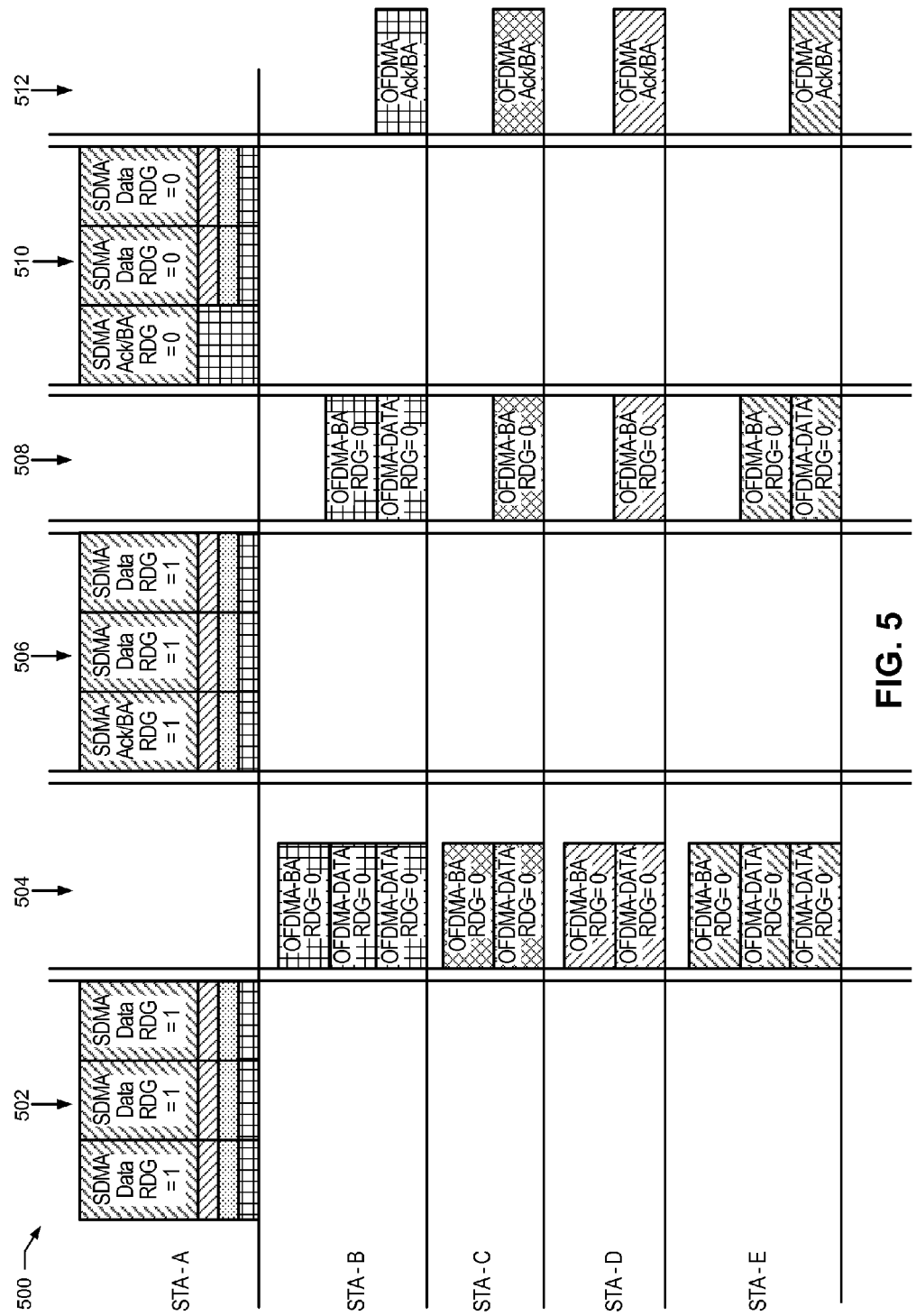
FIG. 5 shows a diagram illustrating aspects of extended RDG with an RD-Initiator using SDMA and RD-Responders using OFDMA for use in aspects of an extended RDG system.

FIG. 5 shows a diagram 500 illustrating aspects of extended RDG with an RD-Initiator using SDMA and RD-Responders using OFDMA for use in aspects of an extended RDG system.

At 502, STA-A is an RD-initiator that uses SDMA during a TxOP to transmit data to stations STA-B through STA-E. The data transmission includes a RDG indicator (i.e., RDG=1) that informs the receiving stations that they may transmit their data in a remaining portion of the TxOP.

At 504, the receiving stations (RD-responders) use OFDMA to transmit Block ACK in response to the data transmission and all receiving stations also transmit some data back to the STA-A in the indicated portion of the TxOP.

At 506, STA-A transmits a Block ACK to acknowledge the data from the RD-responders and then transmits additional data again including the RDG indicator that informs the receiving stations that they may transmit their data in a remaining portion of the TxOP.

At 508, the RD-responders transmit Block ACK in response to the received data and stations STA-B and STA-E also take advantage of the RDG to transmit additional data back to STA-A in the remaining portion of the TxOP.

At 510, STA-A transmits a Block ACK to acknowledge the data from STA-B and STA-E and then transmits additional data but does not include the RDG indicator (i.e., RDG=0) thereby indicating that the RD-responders may not transmit data to STA-A.

At 512, the RD-responders transmit Block ACK in response to the received data.

Figure 6:
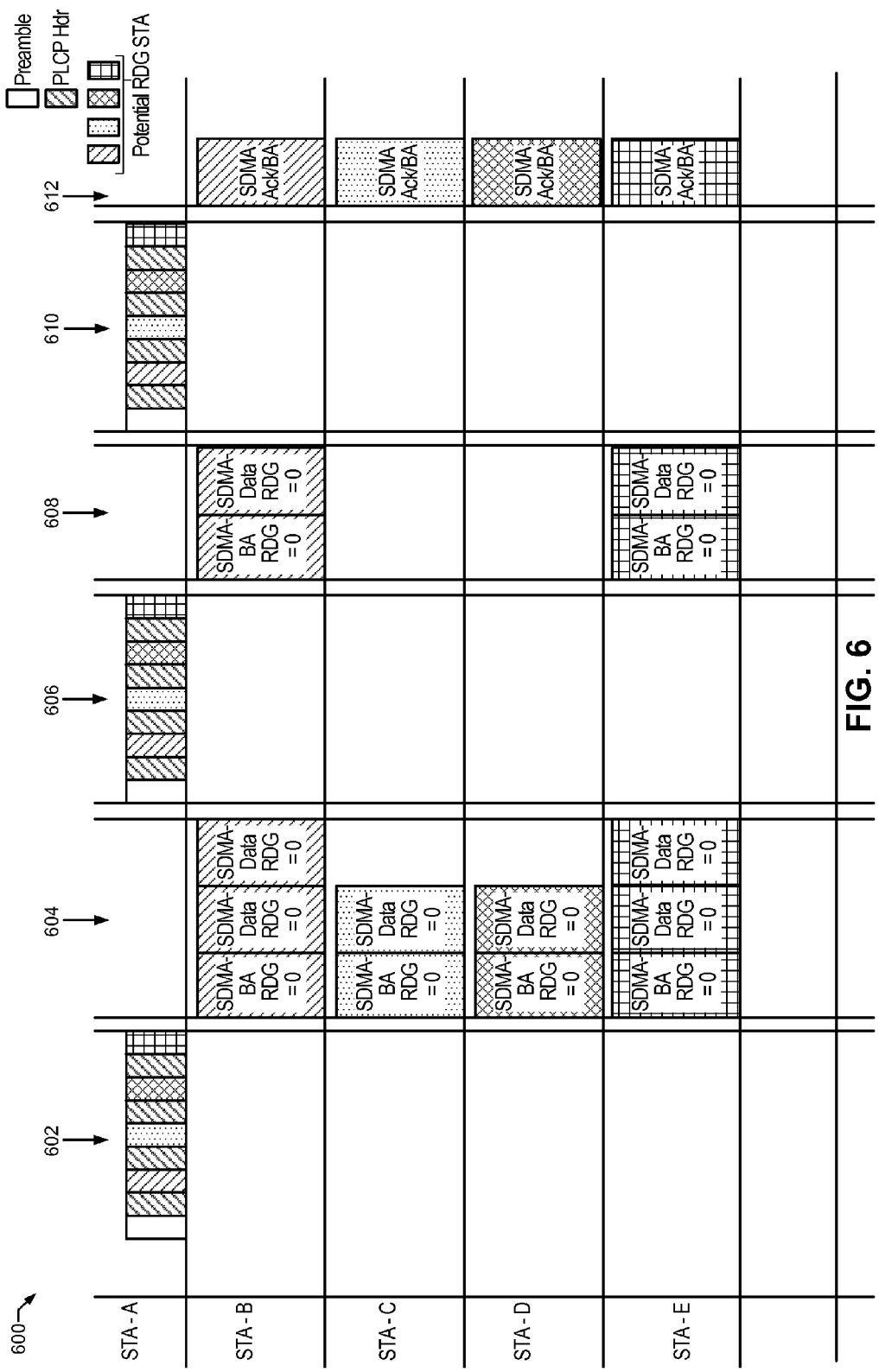
FIG. 6 shows a diagram illustrating aspects of extended RDG with an RD-Initiator using APPDU and RD-Responders using SDMA for use in aspects of an extended RDG system.

FIG. 6 shows a diagram 600 illustrating aspects of extended RDG with an RD-Initiator using an APPDU and RD-Responders using SDMA for use in aspects of an extended RDG system.

At 602, STA-A is an RD-initiator that uses an APPDU during a TxOP to transmit data to stations STA-B through STA-E. The APPDU data transmission includes a RDG indicator (i.e., RDG=1) that informs the receiving stations that they may transmit their data in a remaining portion of the TxOP.

At 604, the receiving stations (RD-responders) use SDMA to transmit Block ACK in response to the data transmission and all receiving stations also transmit some data back to the STA-A in the indicated portion of the TxOP.

At 606, STA-A transmits additional data again including the RDG indicator that informs the receiving stations that they may transmit their data in a remaining portion of the TxOP.

At 608, the RD-responders STA-B and STA-E transmit Block ACK in response to the received data and also take advantage of the RDG to transmit additional data back to STA-A in the remaining portion of the TxOP.

At 610, STA-A transmits additional data but does not include the RDG indicator (i.e., RDG=0) thereby indicating that the RD-responders may not transmit data to STA-A.

At 612, the RD-responders transmit Block ACK in response to the received data.

Figure 7:
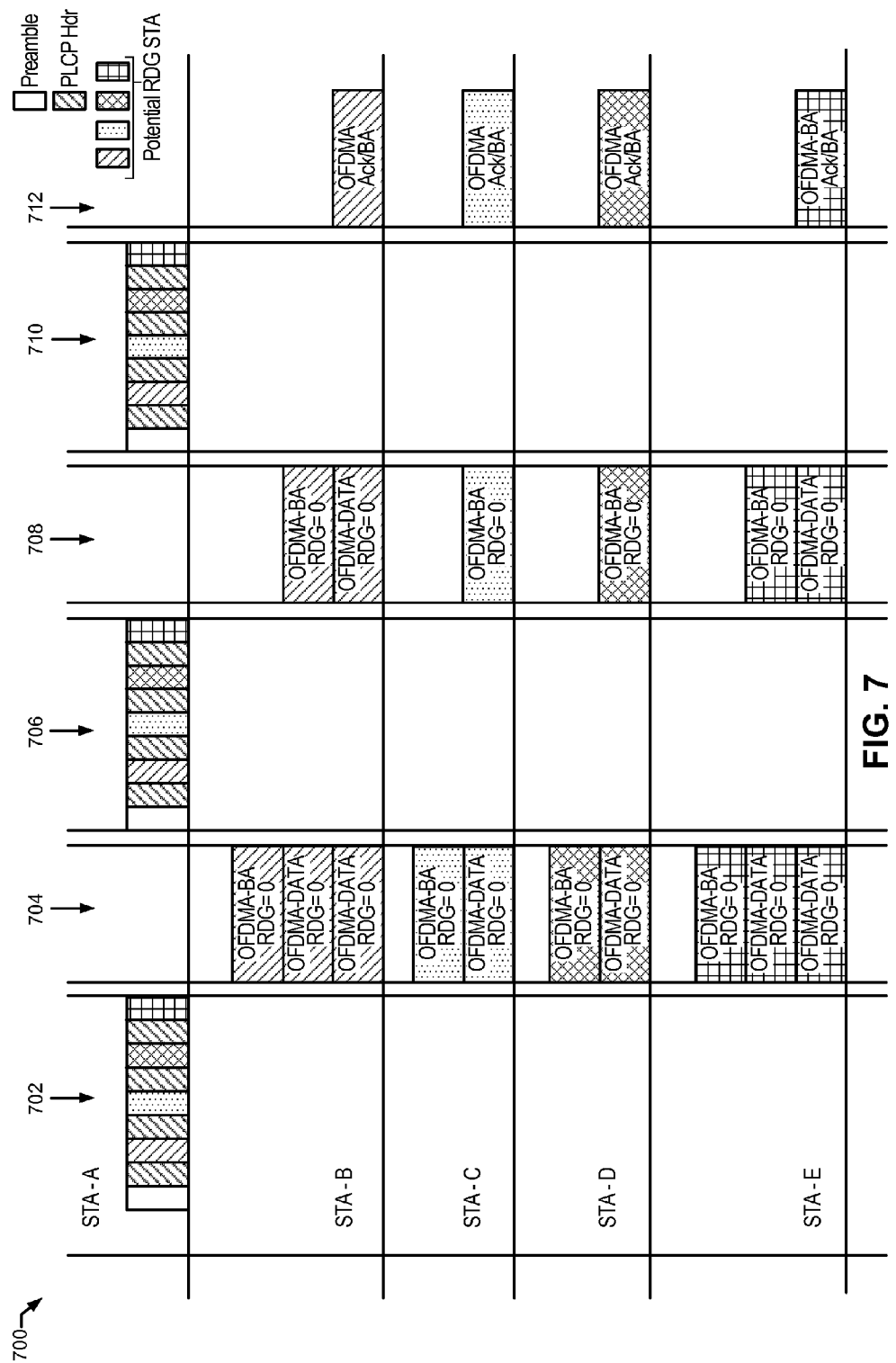
FIG. 7 shows a diagram illustrating aspects of extended RDG with an RD-Initiator using APPDU and RD-Responders using OFDMA for use in aspects of an extended RDG system.

FIG. 7 shows a diagram 700 illustrating aspects of extended RDG with an RD-Initiator using APPDU and RD-Responders using OFDMA for use in aspects of an extended RDG system.

At 702, STA-A is an RD-initiator that uses an APPDU during a TxOP to transmit data to stations STA-B through STA-E. The data transmission includes a RDG indicator (i.e., RDG=1) that informs the receiving stations that they may transmit their data in a remaining portion of the TxOP.

At 704, the receiving stations (RD-responders) use OFDMA to transmit Block ACK in response to the data transmission and all receiving stations also transmit some data back to the STA-A in the indicated portion of the TxOP.

At 706, STA-A transmits additional data again including the RDG indicator that informs the receiving stations that they may transmit their data in a remaining portion of the TxOP.

At 708, the RD-responders STA-B and STA-E transmit Block ACK in response to the received data and also take advantage of the RDG to transmit additional data back to STA-A in the remaining portion of the TxOP.

At 710, STA-A transmits additional data but does not include the RDG indicator (i.e., RDG=0) thereby indicating that the RD-responders may not transmit data to STA-A.

At 712, the RD-responders transmit Block ACK in response to the received data.

Figure 8:
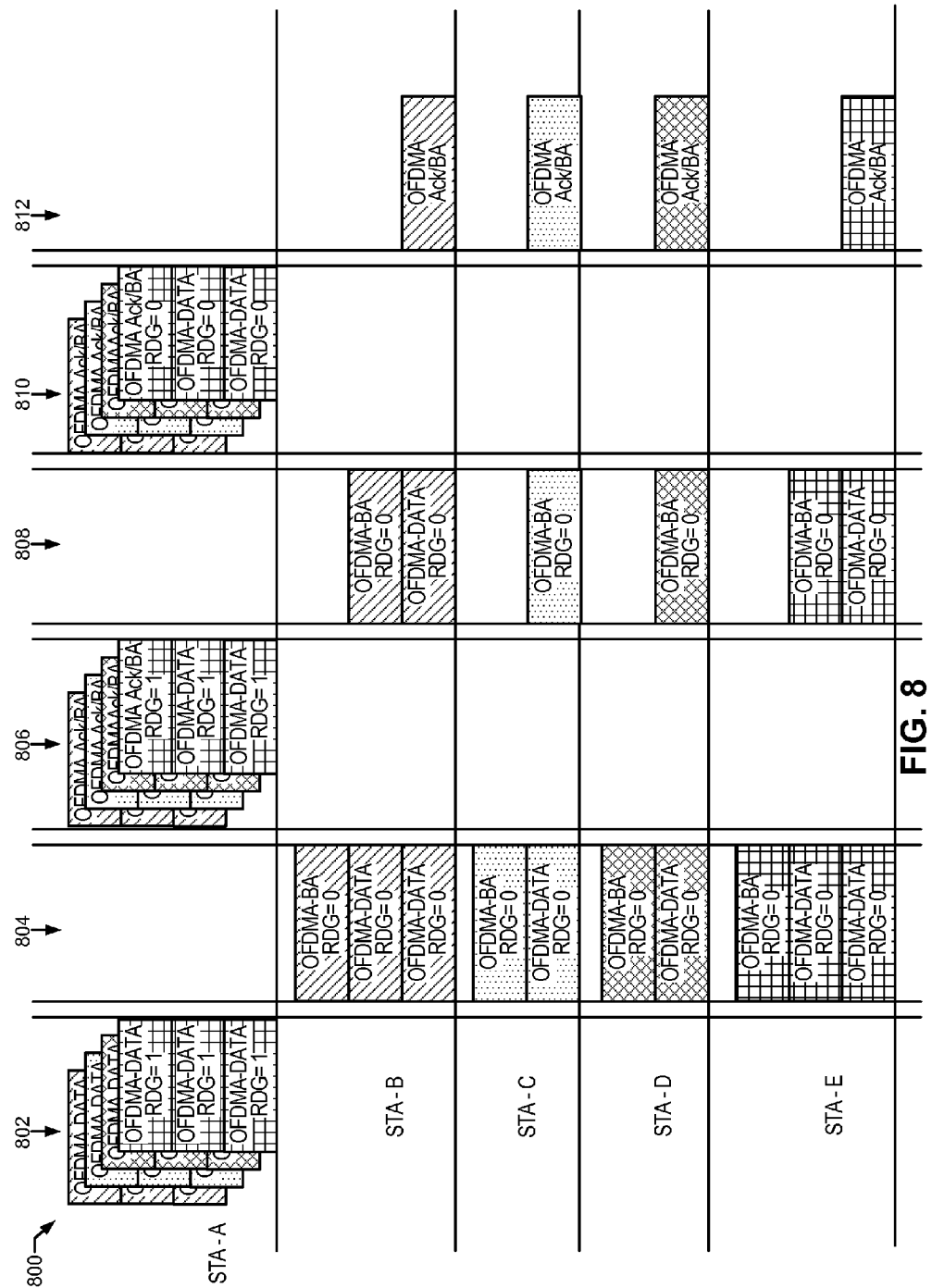
FIG. 8 shows a diagram illustrating aspects of extended RDG with an RD-Initiator using OFDMA and RD-Responders using OFDMA for use in aspects of an extended RDG system.

FIG. 8 shows a diagram 800 illustrating aspects of extended RDG with an RD-Initiator using OFDMA and RD-Responders using OFDMA for use in aspects of an extended RDG system.

At 802, STA-A is an RD-initiator that uses OFDMA during a TxOP to transmit data to stations STA-B through STA-E. The data transmission includes a RDG indicator (i.e., RDG=1) that informs the receiving stations that they may transmit their data in a remaining portion of the TxOP.

At 804, the receiving stations (RD-responders) use OFDMA to transmit Block ACK in response to the data transmission and all receiving stations also transmit some data back to the STA-A in the indicated portion of the TxOP.

At 806, STA-A transmits a Block ACK and additional data again including the RDG indicator that informs the receiving stations that they may transmit their data in a remaining portion of the TxOP.

At 808, the RD-responders STA-B and STA-E transmit Block ACK in response to the received data and also take advantage of the RDG to transmit additional data back to STA-A in the remaining portion of the TxOP.

At 810, STA-A transmits additional data but does not include the RDG indicator (i.e., RDG=0) thereby indicating that the RD-responders may not transmit data to STA-A.

At 812, the RD-responders transmit Block ACK in response to the received data.

Figure 9:
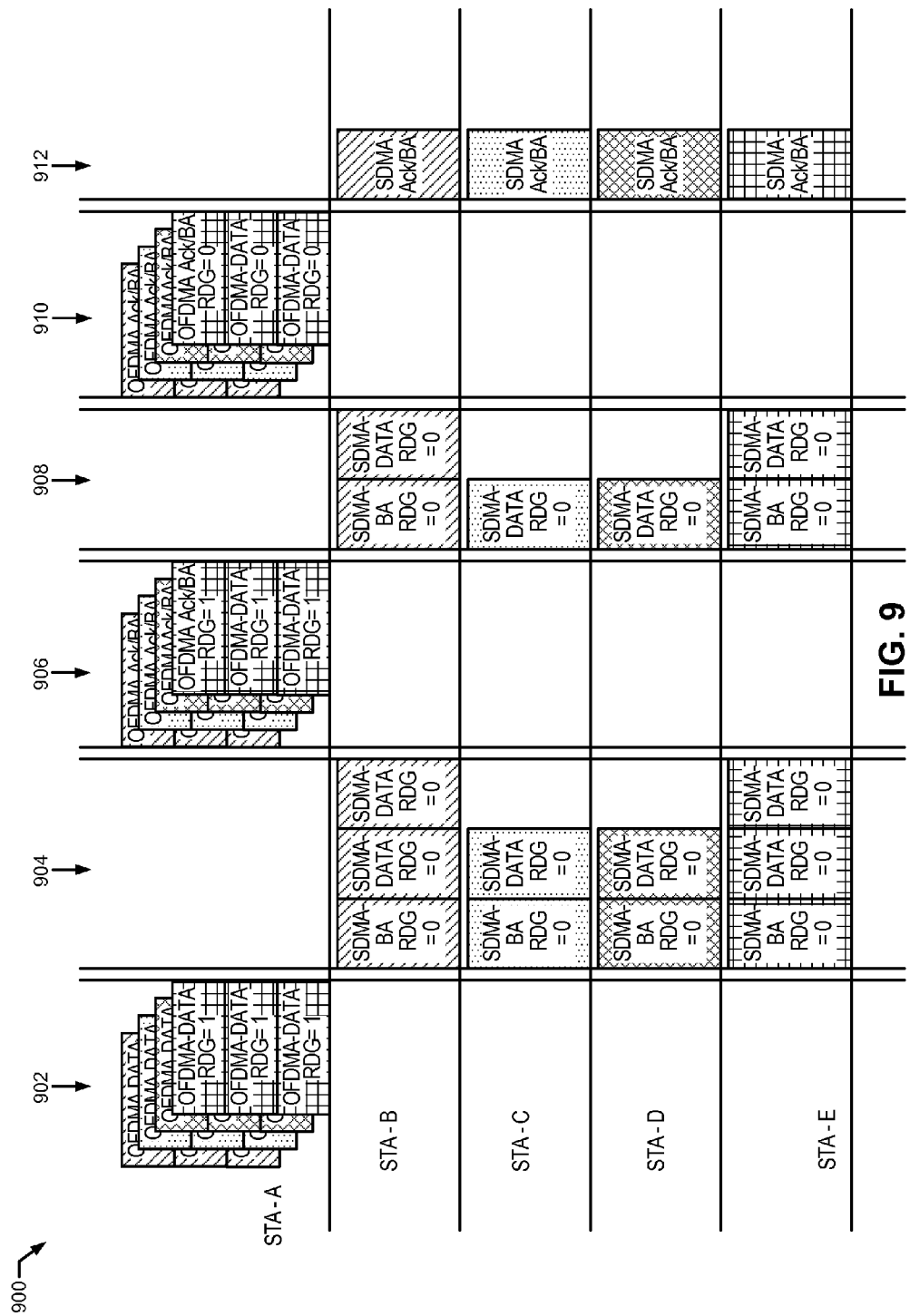
FIG. 9 shows a diagram illustrating aspects of extended RDG with an RD-Initiator using OFDMA and RD-Responders using SDMA for use in aspects of an extended RDG system.

FIG. 9 shows a diagram illustrating aspects of extended RDG with an RD-Initiator using OFDMA and RD-Responders using SDMA for use in aspects of an extended RDG system.

At 902, STA-A is an RD-initiator that uses OFDMA during a TxOP to transmit data to stations STA-B through STA-E. The data transmission includes a RDG indicator (i.e., RDG=1) that informs the receiving stations that they may transmit their data in a remaining portion of the TxOP.

At 904, the receiving stations (RD-responders) use SDMA to transmit Block ACK in response to the data transmission and all receiving stations also transmit some data back to the STA-A in the indicated portion of the TxOP.

At 906, STA-A transmits a Block ACK and additional data again including the RDG indicator that informs the receiving stations that they may transmit their data in a remaining portion of the TxOP.

At 908, the RD-responders STA-B and STA-E transmit Block ACK in response to the received data and also take advantage of the RDG to transmit additional data back to STA-A in the remaining portion of the TxOP.

At 910, STA-A transmits additional data but does not include the RDG indicator (i.e., RDG=0) thereby indicating that the RD-responders may not transmit data to STA-A.

At 912, the RD-responders transmit Block ACK in response to the received data.

Figure 10:
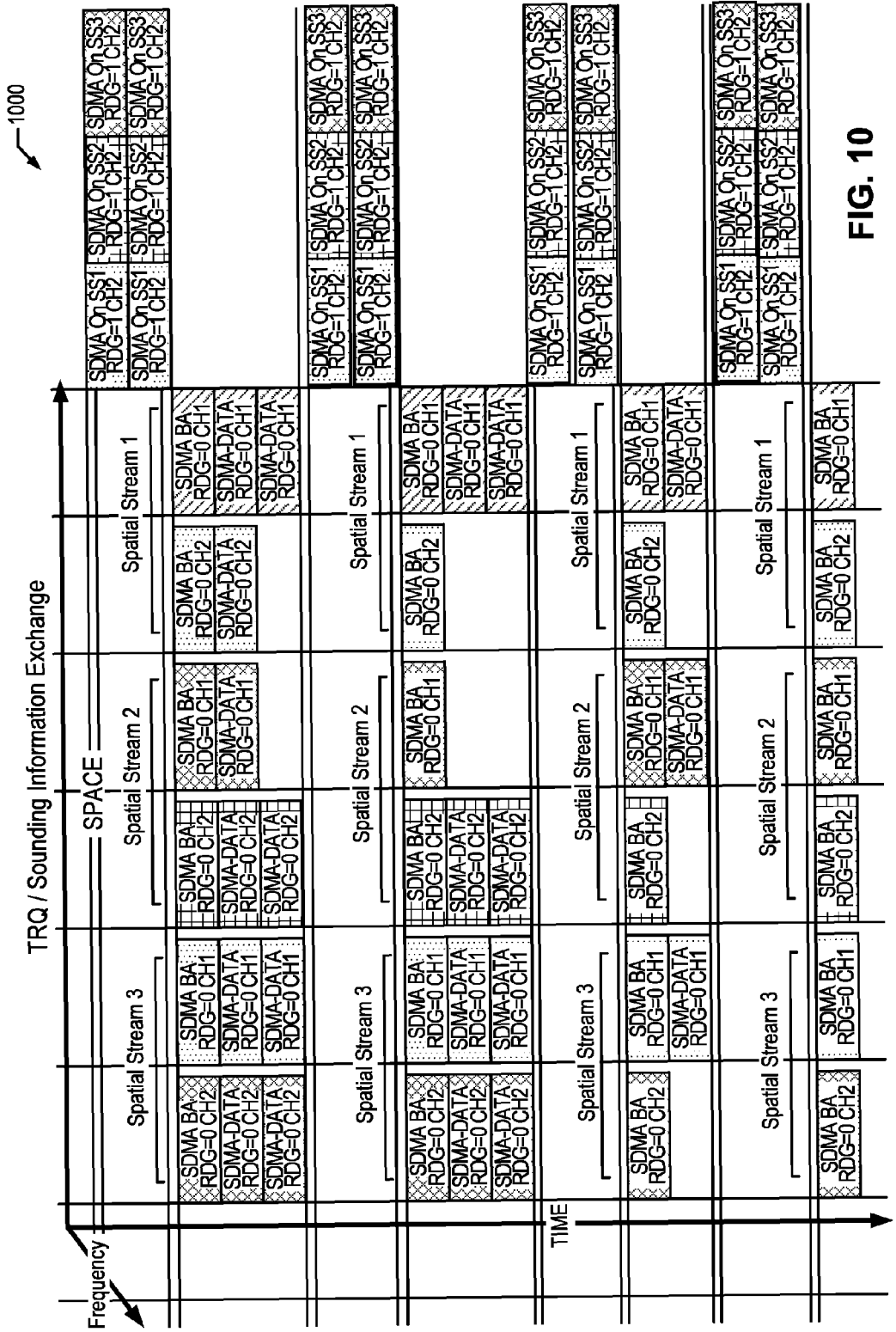
FIG. 10 shows a diagram illustrating aspects of extended RDG with an RD-Initiator using OFDMA+SDMA and RD-Responders using OFDMA+SDMA for use in aspects of an extended RDG system.

FIG. 10 shows a diagram 1000 illustrating aspects of extended RDG with an RD-Initiator using OFDMA+SDMA and RD-Responders using OFDMA+SDMA for use in aspects of an extended RDG system.

Figure 11:
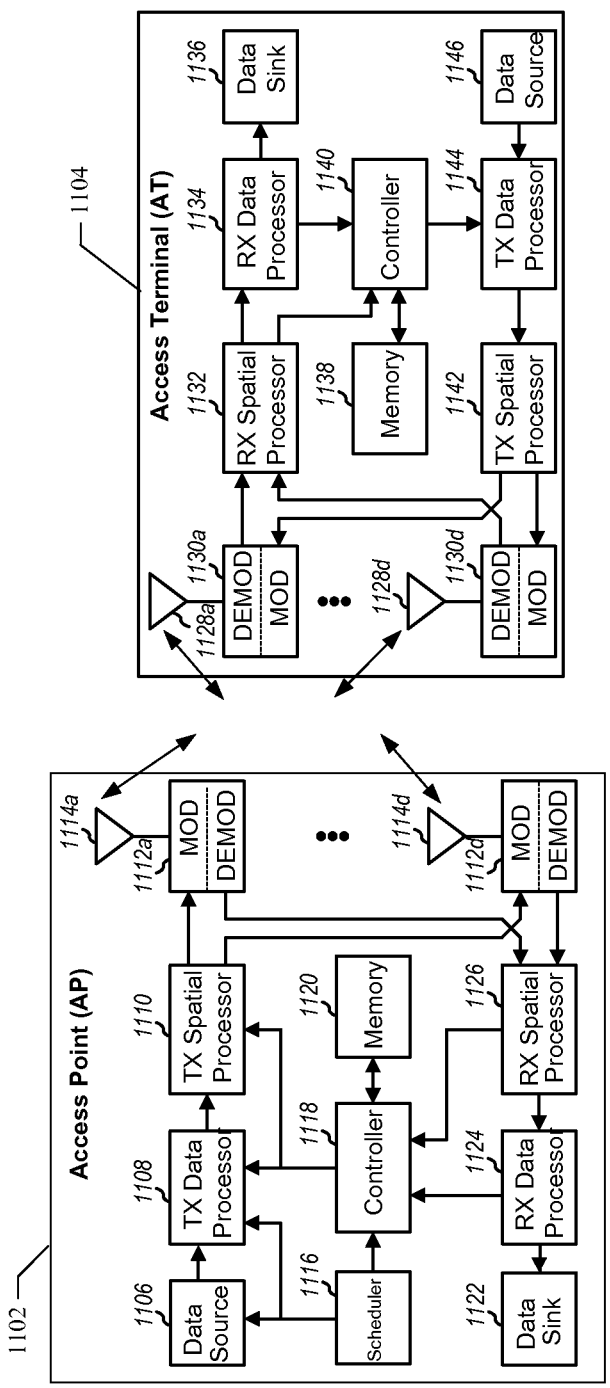
FIG. 11 shows a diagram illustrating aspects of an access point and access terminal that are configured to operate in accordance with aspects of an extended RDG system.

FIG. 11 shows a diagram illustrating aspects of an access point 1102 and access terminal 1104 that are configured to operate in accordance with aspects of an extended RDG system. For example, the access point 1102 is suitable for use as the access point 110*x* shown in FIG. 1, and the access terminal 1104 is suitable for use as the terminal 120*y* also shown in FIG. 1.

Processing by the access point 1102 and the terminal 1104 for downlink and uplink communications is described in further detail below. In various aspects, the processing for the uplink may be the same, different, or complementary to the processing for the downlink.

With respect to downlink processing at access point 1102, a transmit (TX) data processor 1108 receives traffic data (i.e., information bits) from a data source 1106 and signaling and other information from a controller 1118 and possibly a scheduler 1116. The controller is operable to access memory 1120. These various types of data may be sent on different transport channels. The TX data processor 1110 "frames" the data (if necessary), scrambles the framed/unframed data, encodes the scrambled data, interleaves (i.e., reorders) the coded data, and maps the interleaved data into modulation symbols. For simplicity, a "data symbol" refers to a modulation symbol for traffic data, and a "pilot symbol" refers to a modulation symbol for pilot. The scrambling randomizes the data bits. The encoding increases the reliability of the data transmission. The interleaving provides time, frequency, and/or spatial diversity for the code bits. The scrambling, coding, and modulation may be performed based on control signals provided by controller 1118 and are described in further detail below. The TX data processor 1108 provides a stream of modulation symbols for each spatial channel used for data transmission.

A TX spatial processor 1110 receives one or more modulation symbol streams from TX data processor 1108 and performs spatial processing on the modulation symbols to provide four streams of transmit symbols to modulators/demodulators 1112*a-d*, one stream for each transmit antenna 1114*a-d*. The spatial processing is described in further detail below. The TX data processor 1108 and controller 1118 can aggregate the data units and perform the layering necessary to accommodate the WLAN protocols. For example, the TX data processor 1108 and controller 1118 are operable to generate PPDUs as described above having an RDG indicator set to 0 or 1.

Each modulator/demodulator (MODEM) 1122*a-d* receives and processes a respective transmit symbol stream to provide a corresponding stream of OFDM symbols. Each OFDM symbol stream is further processed to provide a corresponding downlink modulated signal. The four downlink modulated signals from the modulator/demodulator 1112*a* through 1112*d* are then transmitted from the four antennas 1114*a* through 1114*d*, respectively.

With respect to downlink processing at the terminal 1104, one or multiple receiving antennas 1128*a-d* receive the transmitted downlink modulated signals, and each receive antenna provides a received signal to a respective demodulator/modulator 1130*a-d*. Each demodulator 1130*a-d* performs processing complementary to that performed at modulator 1112 and provides received symbols. A receive (RX) spatial processor 1132 then performs spatial processing on the received symbols from all demodulators 1130 to provide recovered symbols, which are estimates of the modulation symbols sent by the access point 1102. The recovered symbols are provided to the RX data processor 1134.

An RX data processor 1134 receives and de-multiplexes the recovered symbols into their respective transport channels. The recovered symbols for each transport channel may be symbol de-mapped, de-interleaved, decoded, and descrambled to provide decoded data for that transport channel. The decoded data for each transport channel may include recovered packet data, messages, signaling, and so on, which are provided to a data sink 1136 for storage and/or a controller 1140 for further processing. The controller 1140 is operable to access memory 1138. The received data can also be the various PPDUs as described above having an RDG indicator set to 0 or 1.

Also with respect to the downlink, at each active user terminal, such as terminal 1104, the RX spatial processor 1132 further estimates the downlink to obtain channel state information (CSI). The CSI may include channel response estimates, received SNRs, and so on. The RX data processor 1134 may also provide the status of each packet/frame that is received on the downlink. The controller 1140 receives the channel state information and the packet/frame status and determines the feedback information to be sent back to the access point 1102. The feedback information comprises ACKs, BAs, and data as described above.

With respect to the uplink processing at the terminal 1104, the feedback information is processed by a TX data processor 1144 and a TX spatial processor 1142 (if present), conditioned by one or more modulators 1130a-d, and transmitted via one or more antennas 1128a-d back to the access point 1102. Note that data may also be provided to the TX data processor from data source 1146.

With respect to uplink processing at the access point 1102, the transmitted uplink signal(s) are received by antennas 1114a-d, demodulated by de-modulators 1112a-d, and processed by an RX spatial processor 1126 and an RX data processor 1124 in a complementary manner to that performed at the user terminal 1104. Information from the RX data processor is provided to a data sink 1122. The feedback that is received comprises the various ACKs and BAs and data as described above. The recovered feedback information is then provided to the controller 1118 and the scheduler 1116.

The scheduler 1116 uses the feedback information to perform a number of functions such as (1) selecting a set of user terminals for data transmission on the downlink and uplink, (2) selecting the transmission rate(s) and the transmission mode for each selected user terminal, and (3) assigning the available FCH/RCH resources to the selected terminals. The scheduler 1116 and/or controller 1118 further use information (e.g., steering vectors) obtained from the uplink transmission for the processing of the downlink transmission.

In various aspects, a number of transmission modes are supported for data transmission on the downlink and uplink. For example, the access point 1102 and terminal 1104 are configured to provide transmission modes comprising space division, frequency division, time division, and code division transmission modes.

FIG. 12 shows an exemplary access terminal 1200 for use in aspects of an extended reverse direction grant system. For example, the terminal 1200 provides communications using a channel that is common to a plurality of nodes and the terminal 1200. In an aspect, the terminal 1200 comprises one or more circuits configured to provide aspects of an extended reverse direction grant system as described herein.

The terminal 1200 comprises a first circuit 1202 for receiving, at a first node of the plurality of nodes, a first data communication over the common channel, the first data communication being decodable by other nodes of the plurality of nodes and is received within a transmit opportunity time interval. For example, in an aspect, the first circuit 1202 comprises the RX spatial processor 1132.

The terminal 1200 comprises a second circuit 1204 for determining whether the first data communication comprises a first indicator. For example, in an aspect, the second circuit 1204 comprises controller 1140.

The terminal 1200 also comprises a third circuit 1206 for transmitting a second data communication within the transmit opportunity time interval using selected transmission resources, if the data communication comprises the first indicator. For example, in an aspect, the third circuit 1206 comprises the TX data processor 1144.

FIG. 13 shows an exemplary access point 1300 for use in aspects of an extended reverse direction grant system. For example, the access point 1300 provides communications using a channel that is common to a plurality of nodes and the access point 1300. In an aspect, the access point 1300 comprises one or more circuits configured to provide aspects of an extended reverse direction grant system as described herein.

The access point 1300 comprises a first circuit 1302 for transmitting first data to a plurality of nodes using a first transmission resource, wherein the first data is transmitted within a transmit opportunity time interval and comprises a first indicator. For example, in an aspect, the first circuit 1302 comprises the TX data processor 1108.

The access point 1300 comprises a second circuit 1304 for receiving, in response to the first indicator, at least one data transmission from at least one of the nodes, respectively, wherein the at least one data transmission was transmitted using at least one second transmission resource, respectively, and is received within the transmit opportunity time interval. For example, in an aspect, the second circuit 1304 comprises the RX data processor 1124.

In various aspects, the system comprises a computer program product having one or more program instructions ("instructions") or sets of "codes" stored or embodied on a computer-readable medium. When the codes are executed by at least one processor, for instance, a processor at the AP 1102 or the AT 1104, their execution causes the processor to provide the functions of the reverse link data and acknowledgment system described herein. For example, the computer-readable medium comprises a floppy disk, CDROM, memory card, FLASH memory device, RAM, ROM, or any other type of memory device or computer-readable medium that interfaces to AP 1102 or AT 1104. The sets of codes, when executed, operate to cause the AP 1102 and AT 1104 to provide the various functions/operations described herein.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

In some aspects the node is a wireless node. Such wireless node may provide, for example, connectivity for or to a network (e.g., a wide area network such as the Internet or a cellular network) via a wired or wireless communication link. Thus, the various illustrative logics, logical blocks, modules, and circuits described in connection with the aspects disclosed herein may be implemented or performed in an AT or AP with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the invention. Various modifications to these aspects may be readily apparent to those skilled in the art, and the generic principles defined herein may be applied to other aspects, e.g., in an instant messaging service or any general wireless data communication applications, without departing from the scope of the invention. Thus, the invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of an extended reverse direction grant system (comprising methods and apparatus) for transmission of reverse link data and acknowledgement in a wireless local area network have been illustrated and described herein, it will be appreciated that various changes can be made to the aspects without departing from their characteristics. Therefore, the disclosures and descriptions herein are intended to be illustrative, but not limiting, of the scope of the invention, which is set forth in the following claims.

What is claimed is:

1. A method for communication using a channel that is common to a plurality of nodes, the method comprising:
   transmitting first data to the plurality of the nodes using a first transmission resource, wherein the first data is transmitted within a transmit opportunity time interval granted for transmitting the first data to the plurality of the nodes via the channel and comprises a first indicator, and wherein the first indicator indicates that a remaining portion of the transmit opportunity time interval is available for transmission by the plurality of the nodes; and
   receiving, in response to the first indicator, at least one data transmission from at least one of the nodes, respectively, wherein the at least one data transmission was transmitted using at least one second transmission resource, respectively, and is received within the transmit opportunity time interval.

2. The method of claim 1, further comprising generating the first data to comprise at least one resource identifier that identifies the at least one second transmission resource, respectively.

3. The method of claim 2, wherein the first indicator comprises the at least one resource identifier.

4. The method of claim 1, wherein the first indicator comprises a selected bit associated with the first data that is set to a first state.

5. The method of claim 1, wherein the first transmission resource comprises at least one resource selected from a set comprising space, frequency, time, and code division resources.

6. The method of claim 1, wherein the at least one second transmission resource comprises at least one resource selected from a set comprising space, frequency, time, and code division resources.

7. The method of claim 1, wherein a first data transmission of the at least one data transmission received from a first node of the at least one of the nodes is received simultaneously with receiving a second data transmission of the at least one data transmission from a second node of the at least one of the nodes.

8. An apparatus for communication using a channel that is common to a plurality of nodes, the apparatus comprising:
   a transmitter configured to transmit first data to the plurality of the nodes using a first transmission resource, wherein the first data is transmitted within a transmit opportunity time interval granted for transmitting the first data to the plurality of the nodes via the channel and comprises a first indicator, and wherein the first indicator indicates that a remaining portion of the transmit opportunity time interval is available for transmission by the plurality of the nodes; and
   a receiver configured to receive, in response to the first indicator, at least one data transmission from at least one of the nodes, respectively, wherein the at least one data transmission was transmitted using at least one second transmission resource, respectively, and is received within the transmit opportunity time interval.

9. The apparatus of claim 8, wherein said transmitter is configured to generate the first data to comprise at least one resource identifier that identifies the at least one second transmission resource, respectively.

10. The apparatus of claim 9, wherein the first indicator comprises the at least one resource identifier.

11. The apparatus of claim 8, wherein the first indicator comprises a selected bit associated with the first data that is set to a first state.

12. The apparatus of claim 8, wherein the first transmission resource comprises at least one resource selected from a set comprising space, frequency, time, and code division resources.

13. The apparatus of claim 8, wherein the at least one second transmission resource comprises at least one resource selected from a set comprising space, frequency, time, and code division resources.

14. The apparatus of claim 8, wherein a first data transmission of the at least one data transmission received from a first node of the at least one of the nodes is received simultaneously with receiving a second data transmission of the at least one data transmission from a second node of the at least one of the nodes.

15. An apparatus for communication using a channel that is common to a plurality of nodes, the apparatus comprising:
   means for transmitting first data to the plurality of the nodes using a first transmission resource, wherein the first data is transmitted within a transmit opportunity time interval granted for transmitting the first data to the plurality of the nodes via the channel and comprises a first indicator, and wherein the first indicator indicates that a remaining portion of the transmit opportunity time interval is available for transmission by the plurality of the nodes; and
   means for receiving, in response to the first indicator, at least one data transmission from at least one of the nodes, respectively, wherein the at least one data transmission was transmitted using at least one second transmission resource, respectively, and is received within the transmit opportunity time interval.

16. The apparatus of claim 15, wherein said means for transmitting operates to generate the first data to comprise at least one resource identifier that identifies the at least one second transmission resource, respectively.

17. The apparatus of claim 16, wherein the first indicator comprises the at least one resource identifier.

18. The apparatus of claim 15, wherein the first indicator comprises a selected bit associated with the first data that is set to a first state.

19. The apparatus of claim 15, wherein the first transmission resource comprises at least one resource selected from a set comprising space, frequency, time, and code division resources.

20. The apparatus of claim 15, wherein the at least one second transmission resource comprises at least one resource selected from a set comprising space, frequency, time, and code division resources.

21. The apparatus of claim 15, wherein a first data transmission of the at least one data transmission received from a first node of the at least one of the nodes is received simultaneously with receiving a second data transmission of the at least one data transmission from a second node of the at least one of the nodes.

22. A computer program product for communication using a channel that is common to a plurality of nodes, the computer program product comprising:
a non-transitory computer-readable storage medium encoded with codes executable to:
transmit first data to the plurality of the nodes using a first transmission resource, wherein the first data is transmitted within a transmit opportunity time interval granted for transmitting the first data to the plurality of the nodes via the channel and comprises a first indicator, and wherein the first indicator indicates that a remaining portion of the transmit opportunity time interval is available for transmission by the plurality of the nodes; and
receive, in response to the first indicator, at least one data transmission from at least one of the nodes, respectively, wherein the at least one data transmission was transmitted using at least one second transmission resource, respectively, and is received within the transmit opportunity time interval.

23. An access point for communication using a channel that is common to a plurality of nodes, the access point comprising:
an antenna;
a transmitter coupled to the antenna and configured to transmit first data to the plurality of the nodes using a first transmission resource, wherein the first data is transmitted within a transmit opportunity time interval granted for transmitting the first data to the plurality of the nodes via the channel and comprises a first indicator, and wherein the first indicator indicates that a remaining portion of the transmit opportunity time interval is available for transmission by the plurality of the nodes; and
a receiver configured to receive, in response to the first indicator, at least one data transmission from at least one of the nodes, respectively, wherein the at least one data transmission was transmitted using at least one second transmission resource, respectively, and is received within the transmit opportunity time interval.

24. A method for communication using a channel that is common to a plurality of nodes, the method comprising:
receiving, at a first node of the plurality of nodes, a first data communication over the common channel, the first data communication being decodable by other nodes of the plurality of nodes and is received within a transmit opportunity time interval granted for transmitting the first data communication to the plurality of the nodes via the channel;
determining whether the first data communication comprises a first indicator, wherein the first indicator indicates that a remaining portion of the transmit opportunity time interval is available for transmission by the plurality of the nodes; and
transmitting a second data communication within the transmit opportunity time interval using selected transmission resources, if the first data communication comprises the first indicator.

25. The method of claim 24, further comprising identifying the selected transmission resources by a resource identifier in the first data communication.

26. The method of claim 25, wherein the first indicator comprises the resource identifier.

27. The method of claim 24, wherein the first indicator comprises a selected bit associated with the first data communication that is set to a first state.

28. The method of claim 24, further comprising determining the selected transmission resources from parameters associated with the first data communication.

29. The method of claim 24, wherein the selected transmission resources comprise some of space, frequency, time, and code division resources.

30. The method of claim 24, wherein the second data communication is configured to be transmitted simultaneously with data communications from the plurality of nodes.

31. An apparatus for communication using a channel that is common to the apparatus and a plurality of nodes, the apparatus comprising:
a receiver configured to receive a first data communication over the common channel, the first data communication being decodable by the plurality of nodes and the apparatus and is received within a transmit opportunity time interval granted for transmitting the first data communication to the plurality of the nodes and the apparatus via the channel;
a controller configured to determine whether the first data communication comprises a first indicator, wherein the first indicator indicates that a remaining portion of the transmit opportunity time interval is available for transmission by the plurality of the nodes and the apparatus; and
a transmitter configured to transmit a second data communication within the transmit opportunity time interval using selected transmission resources, if the first data communication comprises the first indicator.

32. The apparatus of claim 31, wherein said controller is configured to identify the selected transmission resources by a resource identifier in the first data communication.

33. The apparatus of claim 32, wherein the first indicator comprises the resource identifier.

34. The apparatus of claim 31, wherein the first indicator comprises a selected bit associated with the first data communication that is set to a first state.

35. The apparatus of claim 31, wherein said controller is configured to determine the selected transmission resources from parameters associated with the first data communication.

36. The apparatus of claim 31, wherein the selected transmission resources comprise some of space, frequency, time, and code division resources.

37. The apparatus of claim 31, wherein the second data communication is configured to be transmitted simultaneously with data communications from the plurality of nodes.

38. An apparatus for communication using a channel that is common to the apparatus and a plurality of nodes, the apparatus comprising:
- means for receiving a first data communication over the common channel, the first data communication being decodable by the plurality of nodes and the apparatus and is received within a transmit opportunity time interval granted for transmitting the first data communication to the plurality of the nodes and the apparatus via the channel;
- means for determining whether the first data communication comprises a first indicator, wherein the first indicator indicates that a remaining portion of the transmit opportunity time interval is available for transmission by the plurality of the nodes and the apparatus; and
- means for transmitting a second data communication within the transmit opportunity time interval using selected transmission resources, if the first data communication comprises the first indicator.

39. The apparatus of claim 38, further comprising means for identifying the selected transmission resources by a resource identifier in the first data communication.

40. The apparatus of claim 39, wherein the first indicator comprises the resource identifier.

41. The apparatus of claim 38, wherein the first indicator comprises a selected bit associated with the first data communication that is set to a first state.

42. The apparatus of claim 38, further comprising means for determining the selected transmission resources from parameters associated with the first data communication.

43. The apparatus of claim 38, wherein the selected transmission resources comprise some of space, frequency, time, and code division resources.

44. The apparatus of claim 38, wherein the second data communication is configured to be transmitted simultaneously with data communications from the plurality of nodes.

45. A computer program product for communication using a channel that is common to a plurality of nodes, the computer program product comprising:
- a non-transitory computer-readable storage medium encoded with codes executable to:
  - receive, at a first node of the plurality of nodes, a first data communication over the common channel, the first data communication being decodable by other nodes of the plurality of nodes and is received within a transmit opportunity time interval granted for transmitting the first data communication to the plurality of the nodes via the channel;
  - determine whether the first data communication comprises a first indicator, wherein the first indicator indicates that a remaining portion of the transmit opportunity time interval is available for transmission by the plurality of the nodes; and
  - transmit a second data communication within the transmit opportunity time interval using selected transmission resources, if the first data communication comprises the first indicator.

46. An access terminal for communication using a channel that is common to the access terminal and a plurality of nodes, the access terminal comprising:
- an antenna;
- a receiver configured to receive a first data communication over the common channel, the first data communication being decodable by the plurality of nodes and the access terminal and is received within a transmit opportunity time interval granted for transmitting the first data communication to the plurality of the nodes and the access terminal via the channel;
- a controller configured to determine whether the first data communication comprises a first indicator, wherein the first indicator indicates that a remaining portion of the transmit opportunity time interval is available for transmission by the plurality of the nodes and the access terminal; and
- a transmitter to transmit via the antenna a second data communication within the transmit opportunity time interval using selected transmission resources, if the first data communication comprises the first indicator.

* * * * *